Jan. 24, 1967  F. W. TWIFORD  3,299,741

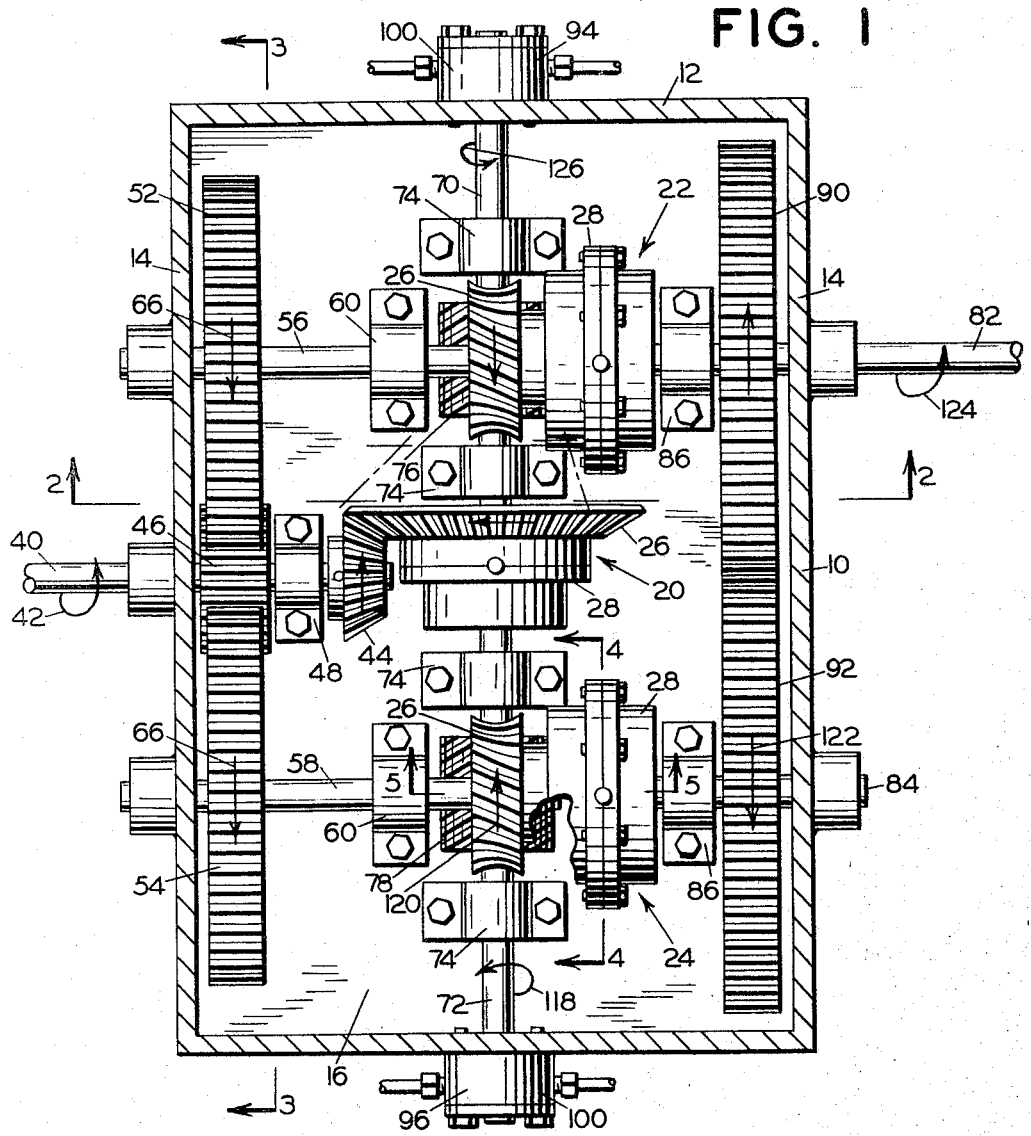
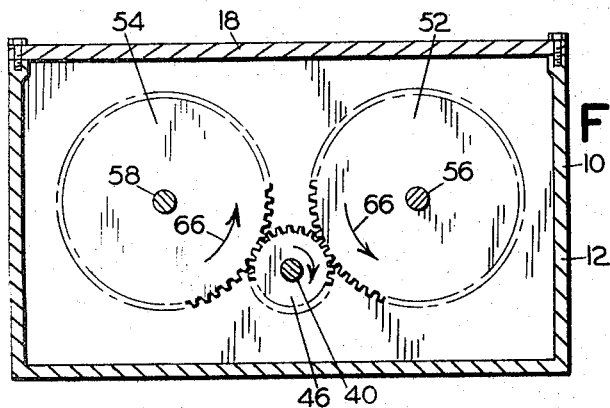

VARIABLE SPEED TRANSMISSION

Filed Oct. 16, 1964  2 Sheets-Sheet 2

INVENTOR.
FRED W. TWIFORD
BY Eugene M. Eckelman
ATTORNEY

United States Patent Office 3,299,741
Patented Jan. 24, 1967

3,299,741
VARIABLE SPEED TRANSMISSION
Fred W. Twiford, Apa 1423, Guadalajara, Jalisco, Mexico
Filed Oct. 16, 1964, Ser. No. 404,356
11 Claims. (Cl. 74—682)

The present invention is concerned with transmission constructions and more specifically pertains to a structure for converting a constant speed drive to outputs of variable speed in forward and reverse directions.

A primary objective of the present invention is to provide a transmission utilizing an all gear connection between the parts, and more particularly to provide in such gear system a novel arrangement of gear differentials.

Another object is to provide a transmission of the type described which employs a novel arrangement of gear connections and control means therefor whereby an output shaft may be caused to drive in either forward or reverse directions and at controlled rotative speeds in either of said directions, and furthermore to have a neutral position wherein the output shaft is stationary.

Another object is to provide a variable speed transmission which has a constant torque output at all speeds.

It is another object to provide a variable speed transmission which is completely self contained and lubricated and requires little or no maintenance.

Still another object is to provide a variable speed transmission which utilizes a gear arrangement which prevents overrunning by a load, thus eliminating the necessity of separate brake means.

Additional objects will become apparent from the following specification and claims considered together with the accompanying drawings wherein the numerals of reference indicate like parts.

In the drawings:

FIGURE 1 is a horizontal sectional view taken on the line 1—1 of FIGURE 2 and showing the working parts of the present invention in plan;

FIGURE 3 is a longitudinal, sectional view, somewhat reduced, taken on the line 3—3 of FIGURE 1;

Figure 2:
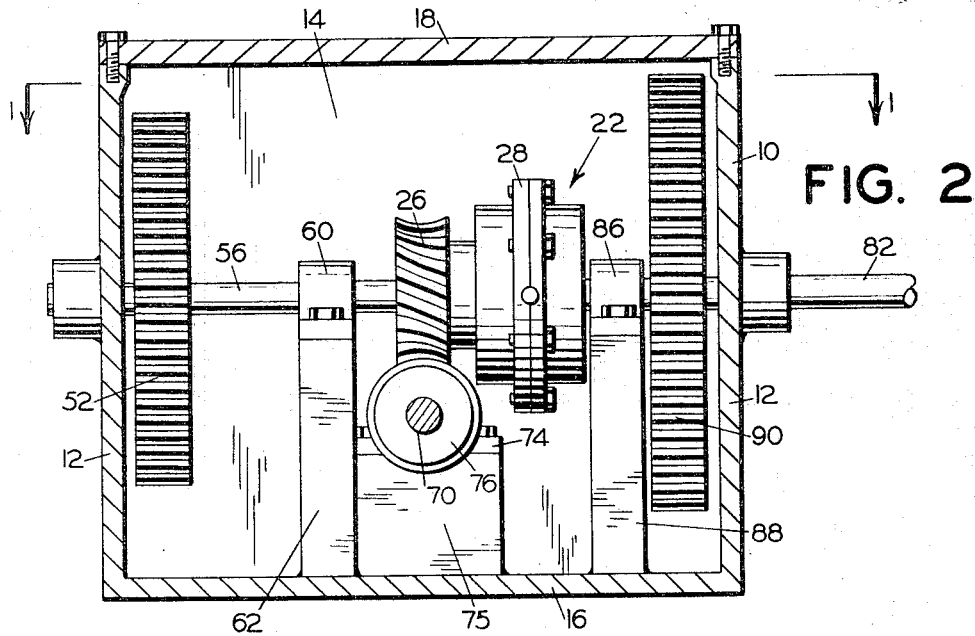
FIGURE 2 is an offset, transverse, sectional view taken on the line 2—2 of FIGURE 1.

The working parts of the present invention are enclosed in a housing 10 having end walls 12, side walls 14 and a bottom wall 16. The housing has a cover 18 which is removably secured for obtaining access to the interior of the housing, said housing preferably being a fluid type container in order that interior working parts can be immersed in oil.

Figure 4:
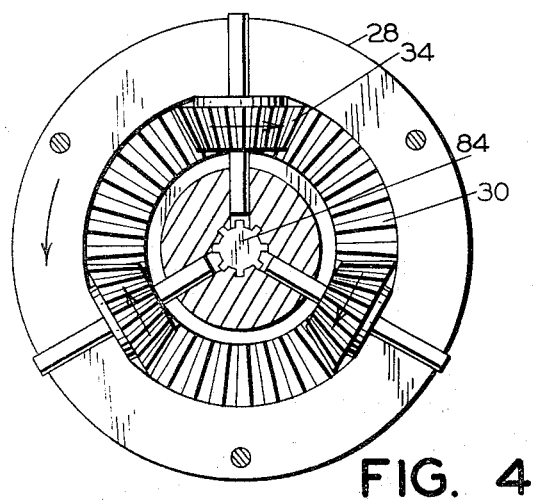
FIGURE 4 is an enlarged, fragmentary sectional view taken on the line 4—4 of FIGURE 1.
Figure 5:
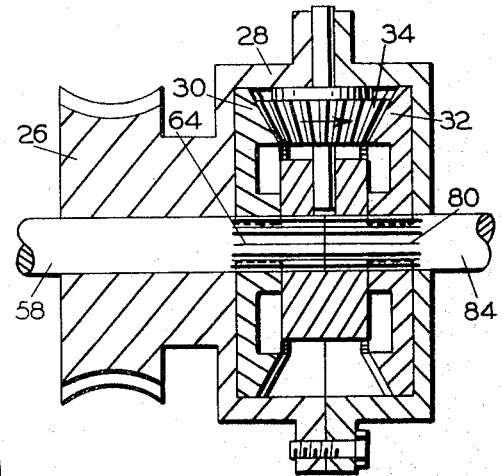
FIGURE 5 is an enlarged, fragmentary, sectional view taken on line 5—5 of FIGURE 1.

Referring first to FIGURE 1 it will be noted that the present transmission utilizes three differentials 20, 22, and 24. Each of these differentials employs a driven or crown gear 26 and a differential housing 28 secured to its respective crown gear. These differential mechanisms are of conventional construction, and as seen in detail in FIGURES 4 and 5 such differentials have a drive ring gear 30, a driven ring gear 32, and a spider gear assembly 34 journaled in the housing and intermeshing with the drive and driven ring gears. The gears 30 and 32 are rotatable relative to the housing 28. A gear ratio of 2–1 is provided between the ring gears and the spider gears, whereby it is apparent that if one of the ring gears 30 or 32 is stationary, the other ring gear, upon rotation of the housing, will rotate twice the speed of said housing. Although FIGURES 4 and 5 are detail views of the differential 24, these views are illustrative of the construction of the other differentials 20 and 22 and details of the latter two differentials are not repeated.

Leading into one side wall 14 of the housing 10 is an output shaft 40, FIGURES 1 and 3, from a power source such as a gasoline or diesel engine, an electric motor, or other drive means, and for purposes of illustration input shaft 40 is rotated counterclockwise in the direction of arrow 42. Shaft 40 is driven at constant speed and torque.

Secured to an inwardly projecting end of shaft 40 is a beveled pinion gear 44 and a spur pinion gear 46, the shaft 40 receiving bearing support interiorly of the housing by a bearing member 48 supported on the bottom wall of the housing 10.

Gear 46 is in mesh with a pair of gears 52 and 54 disposed on opposite sides thereof and keyed or otherwise secured on respective shafts 56 and 58. These shafts are journaled in a side wall 14 of the housing 10 and also in bearings 60 supported on blocks 62, FIGURE 2.

Shafts 56 and 58 project inwardly beyond the bearings 60, freely through crown gears 26 of differentials 22 and 24, respectively, and have a splined connection 64 (as illustrated in FIGURE 5) with the drive ring gears 30 of the respective differentials. By the gear and shaft arrangement just described it is apparent that gears 52 and 54 are driven in a common direction by the pinion gear 46, namely in the direction of arrows 66, and shafts 56 and 58 and their respective drive ring gears 30 are also driven in this same direction.

Projecting in opposite directions from a splined connection with the drive and driven ring gears of differential 20 are shafts 70 and 72 journaled at their ends in end walls 12 of the housing 10 and also in intermediate bearings 74 supported on blocks 75, FIGURE 2. Shafts 70 and 72 have worm gears 76 and 78, respectively, keyed thereto and these worm gears are in mesh with the crown gears 26 of differentials 22 and 24, respectively. The worm gears 76 and 78 have a gear ratio of 1–2 with the crown gears 26 of the differentials 22 and 24, and in a preferred construction the helix angle of the teeth of the worm gears is 20° or less so that the crown gears cannot command the worm gears whereby any reverse torque of a load cannot cause reverse rotation of the crown gears in the event of power shut-off, as will be more fully described hereinafter.

Leading from a splined connection (as illustrated in FIGURE 5) with driven ring gears 32 of the differentials 22 and 24 are shafts 82 and 84 journaled in bearings 86 on blocks 88, FIGURE 2, as well as in the side walls of the housing, the shaft 82 projecting outwardly beyond the housing and comprising the output shaft of the transmission. Keyed to the shafts 82 and 84 and disposed in direct meshing relation are spur gears 90 and 92. Since the gears 90 and 92 are directly meshed they rotate in opposite directions.

Shafts 70 and 72 project outwardly beyond the end walls 12 of the housing 10 and are associated with fluid operated brake assemblies 94 and 96 respectively. These brake assemblies are of conventional construction and each employs a pair of impellers 98, FIGURE 6, one of which impellers in each assembly is secured on the shafts 70 and 72. The valve assemblies 94 and 96 are incorporated in a fluid system including a reservoir 102 and conduits 104 and 106 leading from the reservoir to one side of the brake assemblies 94 and 96. Leading from the opposite sides of brake assemblies 94 and 96 are conduits 108 and 110, respectively, connected to a control valve 112 having a central discharge compartment 114 communicating with the reservoir by means of conduit 116. The brake assemblies 94 and 96 as well as a portion of adjusting valve 112 may be enclosed within the housing 10 whereby the fluid level in the housing will feed the brake assemblies without the necessity of utilizing conduits 104 and 106 and fluid can be discharged directly from valve 112 into the housing without the necessity of conduit 116.

Figure 6:
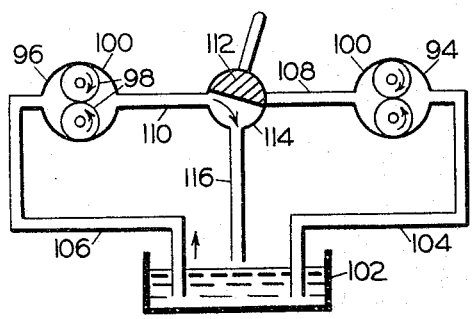
FIGURE 6 is a diagrammatic view of a fluid brake system utilized with the present invention.

The control valve 112 is constructed and arranged such that upon adjustment of this valve the circuit to one or the other of the brake assemblies 94 can be closed, or if desired each may be partially open. At any rate when one of the brake circuits is fully closed, the other is open, as illustrated in FIGURE 6, and when the circuit to a brake is fully closed, that brake is stopped to stop rotation of its respective shaft 70 or 72. Thereupon, it is clear that by selected adjustment of the valve 112, rotation of the shafts 70 or 72 is controlled.

*Operation*

In setting out the operation of the present transmission, and as stated hereinbefore, the shaft 40 rotates in a counterclockwise direction which causes a rotation of pinion 46, gears 52 and 54, shafts 56 and 58 as well as the respective differential drive ring gears on the shafts 56 and 58. The mechanism is operative in controlled forward, reverse, and neutral functions. When it is desired to operate the output shaft in a full speed forward direction, the valve 112 is adjusted such that the fluid brake assembly 94 is fully closed as in FIGURE 6, which anchors the shaft 70 against rotation. Since the shaft 70 is stationary, the meshing engagement of its worm gear 76 with the crown gear 26 of differential 22 also causes the housing 28 of the latter differential to be stationary. Since the shaft 70 is splined to the drive ring gear of differential 20 and since the crown gear 26 of the latter differential is rotatably driven, the shaft 72 is driven in the same direction as the crown gear 26 of the differential 20 and also at twice the rate of rotation. Since the valve 112 is adjusted to fully set the brake 94 the other brake 96 is in released condition and the shaft 72 rotates freely in the direction of arrow 118. Shaft 72 thus drives crown gear 26 of the differential 24 in the direction of arrow 120, and since the crown gear is rotating faster than the drive ring gear 30 of the differential 24 the driven ring gear of the latter differential drives the gear 92 in the direction of arrow 122. This rotation of gear 92 rotates the gear 90 in the opposite direction to produce a forward direction to output shaft 82 in the direction of arrow 124.

The function of the parts just described, wherein the shaft 70 is locked stationary by the brake assembly 94, accomplishes maximum forward speed of shaft 82. To operate the shaft 82 in a full speed reverse rotation, the control valve 112 is adjusted to its other limit position wherein brake 94 is released to let shaft 70 run free and brake 96 is applied to lock shaft 72. Since shaft 72 now is stationary, the driven ring gear 32 of differential 20 is also stationary and the drive ring gear 30 and its shaft 70 are driven in a reverse direction, namely in a direction reverse to that of crown gear 26 of differential 20, designated by the arrow 126. Due to the gear ratio in the differential 20 the shaft 70 will rotate at twice the speed of the crown gear 26 of differential 20, and the rotation of such shaft and crown gear 26 of differential 22 will produce the reverse drive of output shaft 82, namely a direction opposite to arrow 124.

To control the speed of the output shaft, either in its forward or reverse directions, the control valve 112 is adjused to selectively operate the brakes 94 and 96 in partial braking functions. That is, as was seen hereinbefore, one limit position of the control valve operates the transmission at a full forward speed and the other limit position of the control valve operates the torque converter at a full reverse speed. To decrease the speed of the output shaft 82 the control valve is adjusted to release the applied brake 94 or 96 slightly to allow the respective shafts 70 or 72 to turn at desired rates. For example, to move from a full forward speed to a partial forward speed the brake 94 is released selectively wherein the shaft 70 is allowed to turn. Due to the differentiating action of differential 20 rotation of shaft 70 allows slowing of shaft 72. The same is true for slowing the output shaft when operating in reverse, wherein control valve 112 is adjusted to release brake 96 and permit a rotation of shaft 72. As long as the control valve is not in precisely a center position, wherein an equal flow of fluid would operate through brakes 94 and 96, there will be some forward or reverse operation of the output shaft.

When the control valve 112 is precisely centered and each brake 94 and 96 is running freely, the output shaft 82 will be stationary since the gears 90 and 92, operating in opposite directions, neutralize the differentiating action of the differentials 22 and 24.

As stated hereinbefore, the helix angle of the teeth of the worm gears 76 and 78 are 20° or less so that their crown gears 26 cannot cause a reverse rotation of the worm gears in the event that driving torque is not being applied by the input shaft. Such a reverse rotation of the worm gears is prevented in any case where the torque of the load tends to overrun the torque of the input shaft 40. Such reverse torque on the output shaft 82 is divided through gears 90 and 92 and produces a torque on shafts 82 and 84 in opposite directions. This torque then is transmitted back to gears 52 and 54 and balanced out in gear 46. Thus, it is not necessary to provide any form of brake to prevent the load from overrunning the input shaft.

In accordance with the principles of the present invention there is provided a transmission which operates efficiently to produce a desired output speed from a constant input speed. The output shaft operates at a constant torque in either forward or reverse directions, as well as neutral. The operation of the transmission is accomplished simply by a single control valve for the brakes 94 and 96. The apparatus is adapted to operate efficiently over long periods of time, requiring little or no maintenance.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A transmission comprising a drive shaft, a first differential mechanism driven by said drive shaft and having input and output shafts and differentiating mechanism therebetween, second and third differential mechanisms having input and output shafts and differentiating mechanisms therebetween, means drivingly connecting the input shafts of said second and third differentials with said drive shaft, means connecting the input and output shafts of said first differential mechanism with the differentiating mechanism of the second and third differential mechanisms, respectively, means drivingly connecting the output shafts of said second and third differential mechanisms together, one of the latter output shafts comprising a driven shaft of the transmission, and brake means operative on the input and output shafts of said first differential mechanism to control operation of the differentials and vary the speed and direction of the driven shaft.

2. The transmission of claim 1 wherein the means drivingly connecting the input shafts of said second and third differentials with said drive shaft comprise gear means.

3. The transmission of claim 1 wherein the means drivingly connecting the input shafts of said second and third differentials with said drive shaft, and the means drivingly connecting the input and output shafts of the first differential mechanism with the differentiating mechanism of the second and third differential mechanisms all comprise gear means.

4. The transmission of claim 1 wherein the means drivingly connecting the input shafts of said second and third differentials with said drive shaft, the means drivingly connecting the input and output shafts of the first differential mechanism with the differentiating mechanism of the second and third differential mechanisms all comprise gear means, and the means drivingly connecting the output shafts of said second and third differential mechanism together all comprise gear means.

5. The transmission of claim 1 wherein the means drivingly connecting the input shafts of said second and third differentials with said drive shaft comprise gear means, said gear means being arranged to rotate the input shafts of said second and third differentials in the same direction.

6. The transmission of claim 1 wherein the means drivingly connecting the output shafts of said second and third differential mechanisms together comprise gear means, said gear means being arranged to rotate the said output shafts in opposite directions.

7. The transmission of claim 1 wherein the brake means comprise a fluid motor brake.

8. The transmission of claim 1 wherein the brake means comprise a fluid motor brake on each of the input and output shafts of said first differential mechanism, and control means operative to control the actuation of said brake means.

9. The transmission of claim 1 wherein the means drivingly connecting the input and output shafts of the first differential mechanism with the differentiating mechanism of the second and third mechanisms comprise a worm and worm gear.

10. A transmission comprising a drive shaft, a first differential mechanism having a crown gear and housing driven by said drive shaft and having a drive ring gear and a driven ring gear drivingly connected for differential action by spider gears journaled in said housing, first and second shafts splined to said drive ring gear and said driven ring gear, respectively, and extending in opposite directions, second and third differentials each having a crown gear and housing and drive and driven ring gears drivingly connected for differential action by spider gears journaled in their housings, first and second shafts splined to each of the drive and driven ring gears of said second and third differentials, said first and second shafts of each of said second and third differentials projecting in opposite directions, gear means drivingly connecting the two shafts to the drive ring gears of said second and third differentials together for rotation in the same direction, gear means drivingly connecting the two shafts of the driven ring gears of said second and third differentials together for rotation in opposite directions, one of the shafts from the latter mentioned driven ring gears comprising an output shaft gear means drivingly connecting the first and second shafts of said first differential with the crown gears of said second and third differentials, respectively, and brake means operative on the first and second shafts of said first differential to control operation of the differentials and vary the speed and direction of the output shaft.

11. The transmission of claim 10 wherein said brake means comprise a fluid motor brake on each of the first and second shafts of said first differential to control operation of the differentials and vary the speed and direction of the output shaft.

References Cited by the Examiner
UNITED STATES PATENTS

| | | | |
|---|---|---|---|
| 2,088,540 | 7/1937 | Telliez | 74—681 |
| 2,164,729 | 7/1939 | Wilson | 74—681 X |
| 2,377,354 | 6/1945 | Merritt | 74—705 X |
| 3,119,282 | 1/1964 | Raze | 74—682 X |

DAVID J. WILLIAMOWSKY, *Primary Examiner.*

J. R. BENEFIEL, *Assistant Examiner.*